No. 652,023. Patented June 19, 1900.
W. H. GOODWIN.
CHART BLANK.
(Application filed Aug. 21, 1899.)
(No Model.)
-Fig.1-
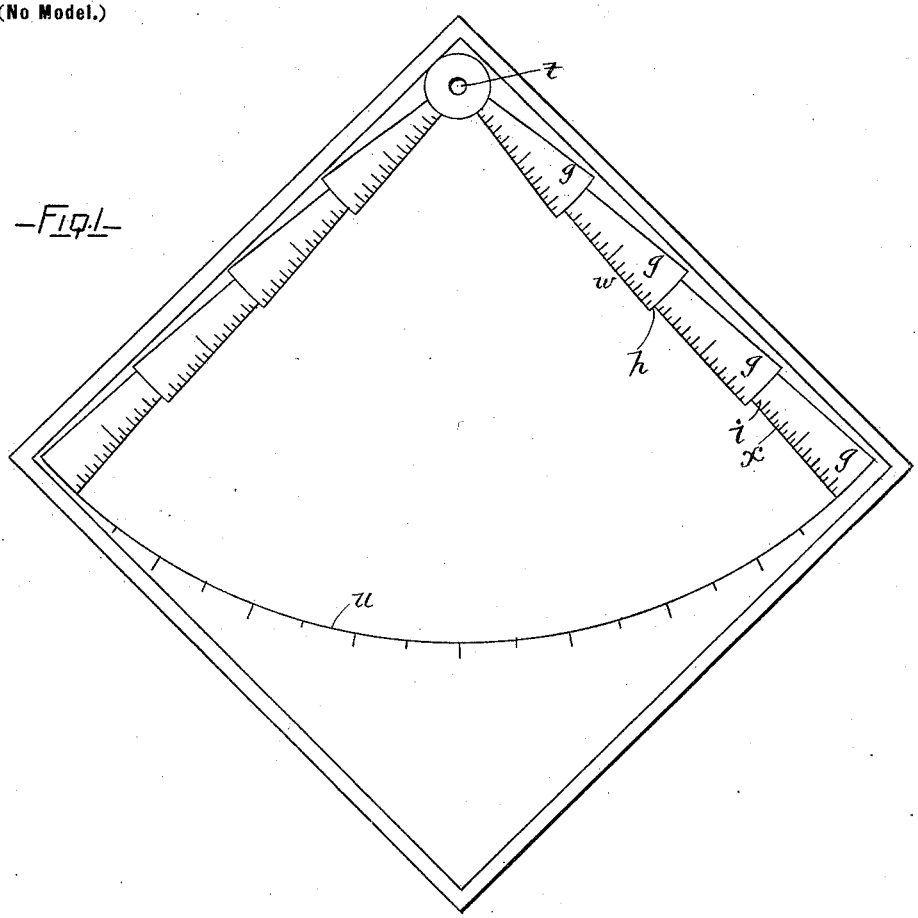
-Fig.2-
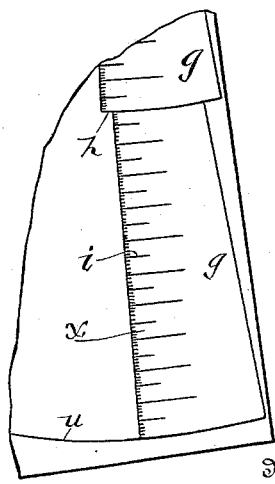
Witnesses
Inventor
William Henry Goodwin
By his Attorney

UNITED STATES PATENT OFFICE.

WILLIAM HENRY GOODWIN, OF TORONTO, CANADA.

CHART-BLANK.

SPECIFICATION forming part of Letters Patent No. 652,023, dated June 19, 1900.

Application filed August 21, 1899. Serial No. 728,023. (No model.)

*To all whom it may concern:*

Be it known that I, WILLIAM HENRY GOODWIN, of the city of Toronto, in the county of York and Province of Ontario, Canada, have invented certain new and useful Improvements in Chart-Blanks; and I do hereby declare that the following is a full, clear, and exact description of the same.

This invention is particularly adapted for the production of chronological charts.

The invention may be briefly described as consisting of a quadrantal chart-blank having one or more radial scales at the radial edge or edges thereof; but for full comprehension of same reference should be had to the annexed drawings, forming a part of this specification, and in which—

Figure 1 is a plan view of the chart-blank, and Fig. 2 an enlarged detail plan view of a portion of one of the time-scales of the blank.

The chart-blank is preferably of rectangular form and has a scale $w$ at two of the adjoining side edges, as shown. An eye $t$ is located at the corner of the chart from which the scales converge, and a graduated arc $u$, divided into a number of equal parts, is marked upon the chart and extends concentrically of the eye $t$ from one scale to the other. Each of these radial time-scales $w$ is divided into four parts $g$, having subdivisions $x$, further subdivided into fifths, of preferably two and one-half inches measurement, and offset from one another, as at $h$, to emphasize the divisional parts, and each of said parts is subdivided, as at $i$, into twenty parts of preferably one-eighth-inch measurement.

It will be observed by referring to Fig. 2 that by the subdivisions of the time-scales each offset main divisional part comprises one hundred subdivisions.

In using my chart-blank to chronologically depict the history of a country, biography of an individual, or the like I find the best results are attained by constituting each offset divisional part of the scales a century when the history of a country is to be depicted or, say, a decade when a biography is to be depicted.

In order to make clear the use for which my chart is intended, I will explain its use in depicting the history of a country, each offset divisional part of the time-scales constituting a century. The student being furnished with the historical events draws an arc on the chart, marking off the period of each event from, say, for example, the beginning of the fifteenth to the completion of the nineteenth century. Radial lines can then be drawn under the guidance of the graduated arc $u$ to present the delimitation of the extent of proportional area covered by the event, and the chart can then be written up and colored, if desired.

What I claim is as follows:

1. A quadrantal chart-blank having one or more radial scales at the radial edge or edges thereof substantially as described and for the purpose set forth.

2. A quadrantal chart-blank having one or more radial scales at the radial edge or edges thereof and a graduated arc substantially as described and for the purpose set forth.

In testimony whereof I have affixed my signature in presence of two witnesses.

WILLIAM HENRY GOODWIN.

Witnesses:
JOSEPH WESLEY ST. JOHN,
JOHN ALEXANDER WILLARD.